United States Patent Office 3,150,045
Patented Sept. 22, 1964

3,150,045
RE-EPITHELIZATION PROCESS
Malcolm P. Boghosian, Long Beach, Calif., assignor to Allergan Pharmaceuticals, Inc., Santa Ana, Calif., a corporation of California
No Drawing. Filed Apr. 16, 1962, Ser. No. 187,928
10 Claims. (Cl. 167—59)

This invention relates to the treatment of a damaged or injured epithelium and, more particularly, to a process for accelerating the regrowth of damaged epithelium, hereinafter usually referred to as re-epithelization.

Epithelial cells, for example of the eye, are sometimes damaged by abrasion and occasionally nicked or otherwise injured. Epithelial injuries are slow to heal and normally exceedingly painful.

The process of the invention accelerates the regeneration of the damaged epithelium by contacting the epithelium with a liquid dispersion of a water-soluble polymeric material. It has been found that certain ones of such materials are particularly useful for accelerating epithelial regeneration and also for providing a soothing action to the damaged epithelial cells.

The preferred water-soluble polymers for use in the process of the invention include polyvinyl alcohol, polyvinylpyrollidone and carboxymethylcellulose. The polymeric materials are dissolved in water in concentrations which permit easy handling of the solutions but which are not too viscous for ready applications. It is desirable that the polymeric material incorporated into a preparation for the treatment of damaged corneal epithelium should be used in a concentration that will not cause excessive blurring of the vision. The desired concentration will vary greatly among the polymeric materials; for example, polyvinyl alcohol is generally used in a concentration of 0.1 to 7 weight percent of the solvent with the preferred concentration being 1–2 weight percent. Carboxymethylcellulose will be generally used in a lesser concentration, generally within the range of 0.1 to 2 weight percent, and preferably in an amount of 0.5–1 weight percent. Polyvinylpyrollidone may be employed in an amount of 0.1 to 28 weight percent, and preferably in a concentration of 3 to 4 weight percent. It will be appreciated that more concentrated solutions of the water-soluble polymers may be employed, but generally speaking the high viscosity of such solutions will interfere with easy application and cause blurring of vision in the case of an ophthalmic solution. Excessively high concentrations of the polymer may cause the solution to become unduly hydroscopic, and bring about a drying out of tissue.

The water-soluble polymer composition is preferably applied hourly or at other regular intervals throughout the waking hours of the patient. A water dispersion of polyvinylpyrollidone has been found to be the most effective of the several available water-soluble polymers. In one comparative test of polyvinylpyrollidone, carboxymethylcellulose, and polyvinyl alcohol, the polyvinylpyrollidone aqueous dispersion accelerated regeneration of the corneal epithelium in all of the treated eyes, compared with an 83% acceleration for carboxymethylcellulose. In the instance of polyvinyl alcohol, 67% of the treated corneal epitheliums evidence acceleration in the regeneration of the damaged cells.

The polyvinyl alcohol used in the process of the invention is preferably of a high molecular weight (in excess of 100,000) and only partially hydrolyzed. It has been found that fully hydrolyzed or nearly fully hydrolyzed materials (in the range of 95–100% hydrolysis) are less effective. The term partially hydrolyzed is used to include materials exhibiting less than 95% hydrolysis. The polyvinyl alcohol preferably has a percent hydrolysis in the range of 85 to 90. It has been found that polyvinyl alcohol having a percent hydrolysis in the range of 73–77 is less effective than the preferred material having a preferred hydrolysis in the range of 85–90.

Water is the preferred solvent for the three polymers, polyvinyl alcohol, polyvinylpyrollidone, and carboxymethylcellulose. Polyvinylpyrollidone is capable of being dissolved in various alcohols, for example, methanol, ethanol, isopropanol, propylene glycol, and glycerol.

The regenerative capacity of the water-soluble polymeric dispersions is demonstrated in the following examples which are for illustrative purposes only, and are not intended to be limiting.

EXAMPLE I

Three albino rabbits weighing approximately 2.0 kilograms each were selected. Under local anesthesia, the superficial corneal epitheliums of the right and left eyes of each animal were removed. One hour after surgery, the eyes of the rabbits were examined and two drops of 2% by weight aqueous polyvinyl alcohol suspension were instilled in the right eyes of the three animals, the left eyes being left untreated to serve as controls. This hourly instillation procedure was performed for eight consecutive hours following surgical removal of the corneal epithelium. The same procedure of eight-hour instillation of the polyvinyl alcohol aqueous dispersion was continued on the second and third days, there being no treatment overnight. During the three day treatment period, the right eye of each test animal received a total of 48 drops of the aqueous polymer dispersion.

The particular polyvinyl alcohol used in the example had a percent hydrolysis in the range of 87–89% and a molecular weight in excess of 100,000. The residual acetate percent was in the range of 19.5–22.7.

In order to clearly observe the regeneration of the corneal epithelium, a 2% solution of the sodium salt of pyronine (fluorescein) was instilled into both the right and left eyes of the test animals at each observation period. The time intervals for the instillation of the pyronine and the results of the observations are found in Charts I–a, I–b and I–c following:

Chart I–a.—*Results of Fluorescein Ultra-Violet Light Examinations*

| Observation period | Animal I, degree of re-epithelization | |
|---|---|---|
| | Right eye, percent | Left eye, percent |
| One hour after surgical removal (no treatments) | 0.0 | 0.0 |
| After eight treatments (8 hours) | 0.0 | 0.0 |
| After eight treatments (16 hours) | 0.0 | 0.0 |
| After sixteen treatments (24 hours) | 12.0 | 0.0 |
| After sixteen treatments (32 hours) | 25.0 | 1.5 |
| After sixteen treatments (40 hours) | 50.0 | 12.0 |
| After twenty treatments (44 hours) | 62.0 | 12.0 |
| After twenty-four treatments (48 hours) | 87.0 | 18.0 |
| After twenty-four treatments (64 hours) | 100.0 | 75.0 |
| After twenty-four treatments (72 hours) | 100.0 | 100.0 |

*Chart I–b.—Results of Fluorescein Ultra-Violet Light Examinations*

| Observation period | Animal II, degree of re-epithelization | |
|---|---|---|
| | Right eye, percent | Left eye, percent |
| One hour after surgical removal (no treatments) | 0.0 | 0.0 |
| After eight treatments (8 hours) | 6.0 | 3.0 |
| After eight treatments (16 hours) | 6.0 | 3.0 |
| After sixteen treatments (24 hours) | 50.0 | 6.0 |
| After sixteen treatments (32 hours) | 50.0 | 6.0 |
| After sixteen treatments (40 hours) | 62.0 | 6.0 |
| After twenty treatments (44 hours) | 87.0 | 18.0 |
| After twenty-four treatments (48 hours) | 93.0 | 50.0 |
| After twenty-four treatments (64 hours) | 100.0 | 81.0 |
| After twenty-four treatments (72 hours) | 100.0 | 100.0 |

*Chart I–c.—Results of Fluorescein Ultra-Violet Light Examinations*

| Observation period | Animal III, degree of re-epithelization | |
|---|---|---|
| | Right eye, percent | Left eye, percent |
| One hour after surgical removal (no treatments) | 0.0 | 0.0 |
| After eight treatments (8 hours) | 12.0 | 0.0 |
| After eight treatments (16 hours) | 12.0 | 0.0 |
| After sixteen treatments (24 hours) | 37.0 | 3.0 |
| After sixteen treatments (32 hours) | 50.0 | 3.0 |
| After sixteen treatments (40 hours) | 62.0 | 3.0 |
| After twenty treatments (44 hours) | 62.0 | 6.0 |
| After twenty-four treatments (48 hours) | 87.0 | 25.0 |
| After twenty-four treatments (64 hours) | 100.0 | 100.0 |
| After twenty-four treatments (72 hours) | 100.0 | 100.0 |

The treated right eyes of the three test animals exhibited more rapid regeneration of the previously removed superficial corneal epithelium in all instances. It will be seen that the control eyes (untreated) exhibited a slower rate of re-epithelization during most of the experimental period; however, during the final hours of examination, the rate of regeneration in the control eyes accelerated. The treated eyes not only reveal a more rapid rate of regeneration of the epithelium than do the untreated eyes but, in addition, the treated eyes exhibit a more constant regeneration rate. Re-epithelization of the treated eyes was complete in the test animals within 64 hours after surgical removal of the superficial corneal epithelium. It is likely that the re-epithelizations of the treated eyes were actually completed closer to the 48 hour observation than the 64 hour observation since the treated eyes at the 48 hour observation period were all quite close to complete healing. In the control eyes, re-epithelization was not complete in all three animals until 72 hours following surgery.

EXAMPLE II

Eighteen albino rabbits under local anesthesia had the superficial corneal epithelium in both their right and left eyes removed. The polymeric materials investigated were polyvinyl alcohol in a 2% weight concentration in normal saline, carboxymethylcellulose in a concentration of 0.5% weight basis in normal saline, and polyvinylpyrollidone in a 3.5% weight basis in normal saline. Pyrogen-free saline in a normal solution was also used for the treatment of some of the eyes. The normal saline solution employed is a sterilized 0.9% solution of sodium chloride in water. In the instance of the polymeric solutions, the polymer was added to the normal saline solution in the amounts previously indicated.

The eighteen albino rabbits were divided into three groups of six rabbits each, and each of the foregoing three polymeric solutions was instilled into the right eyes of the six test animals of one group. The first three animals of each of the three groups had their left eyes instilled with pyrogen-free saline, while the left eyes of the remaining three animals received no medication. Hourly instillations of two drops of the foregoing solutions were made for eight consecutive hours following surgical removal of the superficial corneal epithelium. This same eight hour instillation procedure was continued through three days, there being no treatment overnight. During the three day treatment period, the right eyes of the test animals received 48 drops of test material, while the left eyes received 48 drops of pyrogen-free saline or remained untreated.

The polyvinyl alcohol had the same specification as that used in Example I. The particular polyvinyl-pyrollidone used had a molecular weight of about 40,000.

In order to more clearly observe the regeneration of the superficial corneal epithelium, a 2% solution of the sodium salt of pyronine (fluorescein) was instilled into the right and left eyes of the test animals at each observation period. Observations were made under ultraviolet light. The results of the tests are reported in Charts II, III, and IV below.

*Chart II.—Summary of Fluorescein-Violet Light Examination*

POLYVINYLPYROLLIDONE

Animal # and eye to first attain 100% re-epithelization*:
1—right eye
2—right eye
3—right eye
4—right eye
5—right eye
6—right eye

*Chart III.—Summary of Fluorescein-Violet Light Examination*

CARBOXYMETHYLCELLULOSE

Animal # and eye to first attain 100% re-epithelization*:
1—right eye
2—right eye
3—right eye
4—left eye
5—right eye
6—right eye

*Chart IV.—Summary of Fluorescein-Violet Light Examination*

POLYVINYL ALCOHOL

Animal # and eye to first attain 100% re-epithelization*:
1—equal
2—right eye
3—right eye
4—right eye
5—left eye
6—right eye

* Left eyes animal #'s 1, 2 and 3 treated with pyrogen-free saline. Left eyes animal #'s 4, 5 and 6 untreated. In instances where both eyes attained 100% re-epithelization at the same time, the eye indicated refers to the eye having the highest percentage of re-epithelization prior to attaining 100%.

Referring to Chart II it will be seen that all of the right eyes treated with the polyvinylpyrollidone solution attained re-epithelization before the control left eyes. In the instance of the carboxymethylcellulose solution, as reported in Chart III, five of the right eyes first attained 100% re-epithelization before the control left eyes. In one instance, that of animal No. 4, the untreated left eye had its epithelium first regenerated. In the instance of the polyvinyl alcohol treatment, four of the treated right eyes reached 100% re-epithelization before the control left eyes. In the instance of animal No. 1, the treated and control eyes attained 100% re-epithelization at the same time, with the left eye of animal No. 5 reaching 100% re-epithelization before the treated right eye.

It was found that the eyes treated with pyrogen-free saline were actually retarded by such treatment.

Although exemplary embodiments of the invention have been disclosed herein for purposes of illustration, it will be understood that various changes, modifications, and substitutions may be incorporated in such embodiments without departing from the spirit of the invention as defined by the claims which follow.

I claim:

1. A process for accelerating regeneration of damaged mammalian corneal epithelium consisting essentially of:
   contacting the damaged epithelium with a liquid dispersion of a polymeric material selected from the group consisting of polyvinyl alcohol, polyvinylpyrollidone, and carboxymethylcellulose, said polymeric material being present in an amount sufficient to accelerate regeneration.

2. A process in accordance with claim 1 wherein the liquid dispesion of the water-soluble polymeric material is intermittently applied to the damaged epithelium.

3. A process for accelerating the regeneration of damaged mammalian corneal epithelium consisting essentially of:
   contacting the damaged epithelium with an aqueous dispersion of a water-soluble polymeric material selected from the group consisting of polyvinyl alcohol, polyvinylpyrollidone, and carboxymethylcellulose, said polymeric material being present in an amount sufficient to accelerate regeneration.

4. A process in accordance with claim 3 wherein the aqueous dispersion of the polymeric material is repeatedly applied to the damaged epithelium.

5. A process for accelerating the regeneration of damaged mammalian corneal epithelium consisting essentially of:
   treating the damaged epithelium with an aqueous dispersion of a partially hydrolyzed polyvinyl alcohol, said polyvinyl alcohol being present in an amount sufficient to accelerate regeneration.

6. The process in accordance wtih claim 5 wherein the polyvinyl alcohol is present in the dispersion in a concentration 0.1 to 7 percent of the water.

7. A process for accelerating the regeneration of damaged mammalian corneal epithelium consisting essentially of:
   treating the damaged epithelium with an aqueous dispersion of polyvinylpyrollidone, said polyvinylpyrollidone being present in an amount sufficient to accelerate regeneration.

8. The process in accordance with claim 7 wherein the polyvinyl pyrollidone is present in an amount in the range of 0.1 to 28 weight percent of the water.

9. A process for accelerating the regeneration of damaged mammalian corneal epithelium consisting essentially of:
   treating the damaged epithelium with an aqueous dispersion of carboxymethylcellulose, said carboxymethylcellulose being present in an amount sufficient to accelerate regeneration.

10. A process in accordance with claim 9 wherein the carboxymethylcellulose is present in an amount in the range of 0.1 to 2 weight percent of the water.

References Cited in the file of this patent

UNITED STATES PATENTS

| | | |
|---|---|---|
| 92,209 | Ramsaur | July 6, 1869 |
| 126,363 | Whiteley | Apr. 30, 1872 |
| 273,410 | Wadleigh | Mar. 6, 1883 |
| 1,289,873 | Murakami | Dec. 31, 1918 |
| 2,547,653 | Minnis et al. | Apr. 3, 1951 |
| 2,861,920 | Dale et al. | Nov. 25, 1958 |
| 2,873,192 | Walles et al. | Feb. 10, 1959 |
| 2,897,120 | Cronin et al. | July 28, 1959 |
| 2,968,592 | Curtis | Jan. 17, 1961 |
| 3,008,875 | Dale | Nov. 14, 1961 |
| 3,029,187 | Steinhardt | Apr. 10, 1962 |
| 3,029,188 | Cyr et al. | Apr. 10, 1962 |

FOREIGN PATENTS

| | | |
|---|---|---|
| 797,992 | Great Britain | July 9, 1958 |

OTHER REFERENCES

Vigorelli: Use of Some Re-epithelizing Substances in Experimental Superficial Corneal Wounds (Ital.), Minerva Oftal. 3, pp. 89–91, July–Sept. 1961 (per Index Medicus, 3 (4), S–994, April 1962).